(12) United States Patent
Katsumata et al.

(10) Patent No.: US 10,036,944 B2
(45) Date of Patent: Jul. 31, 2018

(54) PHOSPHOR WHEEL DEVICE AND PROJECTOR-TYPE IMAGE DISPLAY APPARATUS

(71) Applicant: Panasonic Intellectual Property Management Co., Ltd., Osaka (JP)

(72) Inventors: Yohei Katsumata, Osaka (JP); Masato Tanaka, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/454,072

(22) Filed: Mar. 9, 2017

(65) Prior Publication Data

US 2017/0269463 A1  Sep. 21, 2017

(30) Foreign Application Priority Data

Mar. 17, 2016 (JP) ................................. 2016-053358
Jan. 25, 2017 (JP) ................................. 2017-010903

(51) Int. Cl.
| G03B 21/16 | (2006.01) |
| G03B 21/20 | (2006.01) |
| G02B 26/00 | (2006.01) |
| G02B 7/00 | (2006.01) |
| G03B 21/00 | (2006.01) |

(52) U.S. Cl.
CPC .......... *G03B 21/204* (2013.01); *G02B 7/008* (2013.01); *G02B 26/008* (2013.01); *G03B 21/16* (2013.01); *G03B 21/008* (2013.01); *G03B 21/208* (2013.01); *G03B 21/2066* (2013.01)

(58) Field of Classification Search
CPC ...... G02B 26/008; G02B 7/008; G03B 21/16; G03B 21/204; G03B 21/008; G03B 21/2066; G03B 21/208
See application file for complete search history.

(56) References Cited

U.S. PATENT DOCUMENTS

| 2013/0169938 A1* | 7/2013 | Huang ................... G03B 21/16 |
| | | 353/31 |
| 2015/0124429 A1* | 5/2015 | Hoehmann ............... F21V 9/40 |
| | | 362/84 |
| 2016/0077326 A1* | 3/2016 | Yamagishi ........... G02B 26/008 |
| | | 353/61 |
| 2016/0348857 A1* | 12/2016 | Miyata ..................... F21V 9/16 |

FOREIGN PATENT DOCUMENTS

JP         2013-041170 A       2/2013

* cited by examiner

*Primary Examiner* — Sultan Chowdhury
*Assistant Examiner* — Magda Cruz
(74) *Attorney, Agent, or Firm* — McDermott Will & Emery LLP

(57) ABSTRACT

A phosphor wheel device includes a phosphor and a substrate which has a disc shape and on which the phosphor is provided, and the phosphor is provided in at least a portion of a circumference of a circle on the substrate. The circle is centered on the center of a rotational shaft of the substrate. The substrate includes a first opening and a plurality of second openings, and the plurality of second openings extend radially with respect to the center of the rotational shaft.

9 Claims, 10 Drawing Sheets

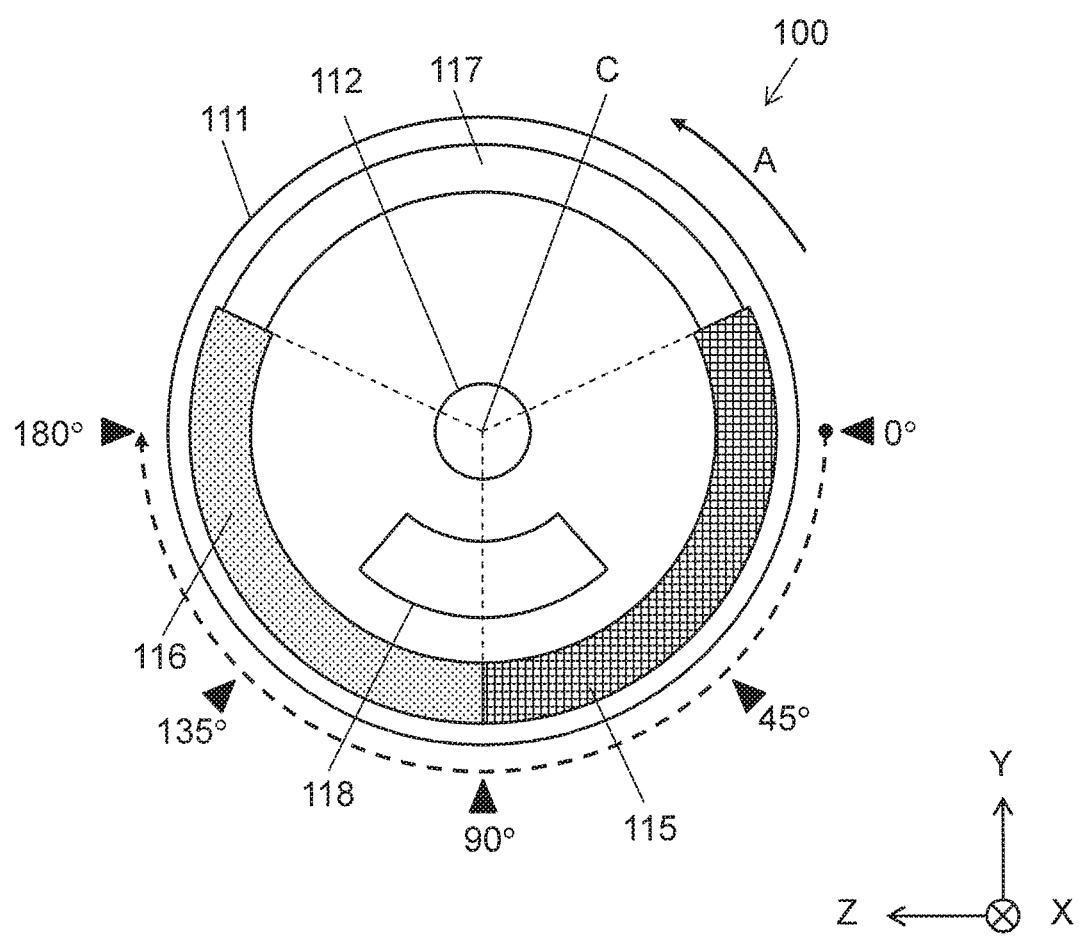

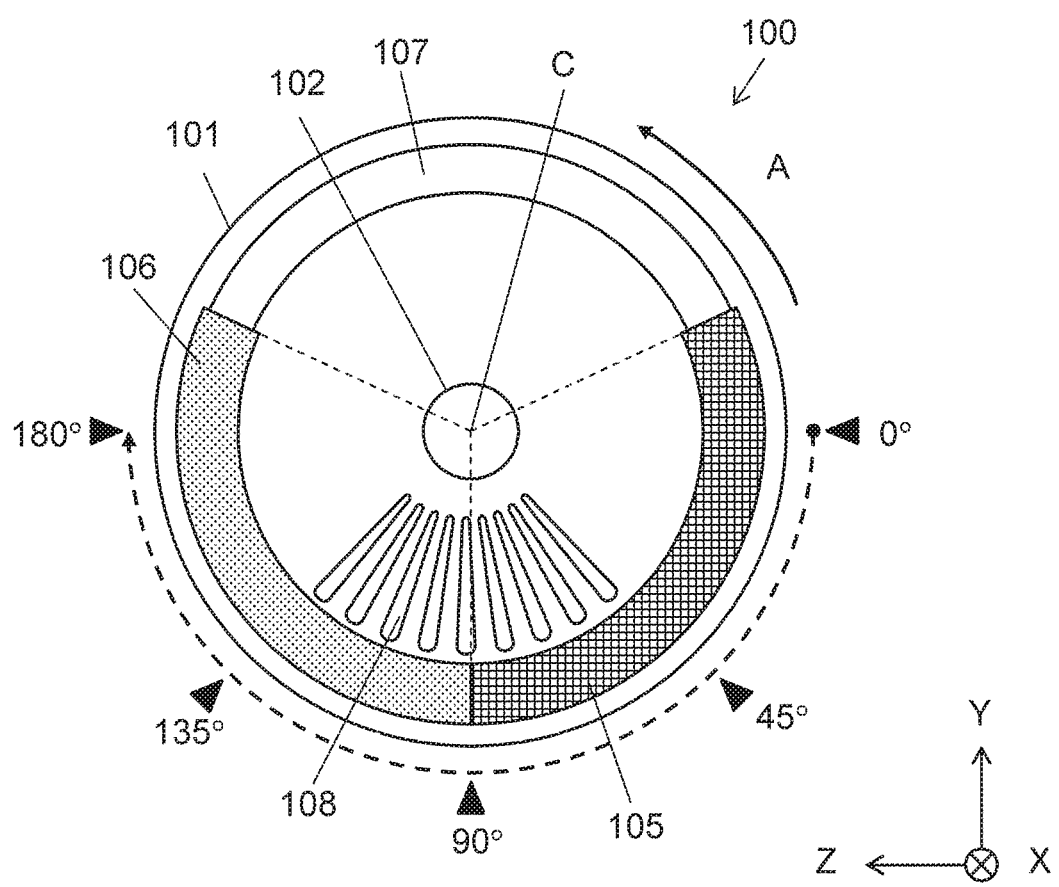

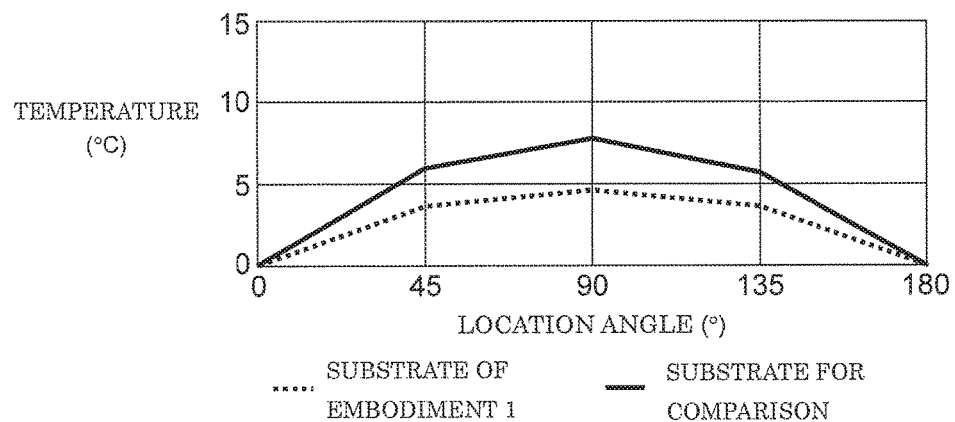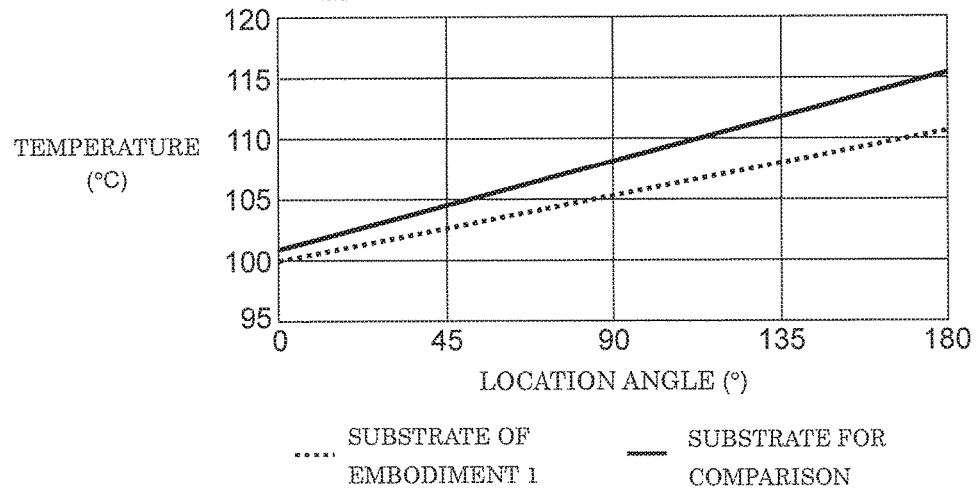

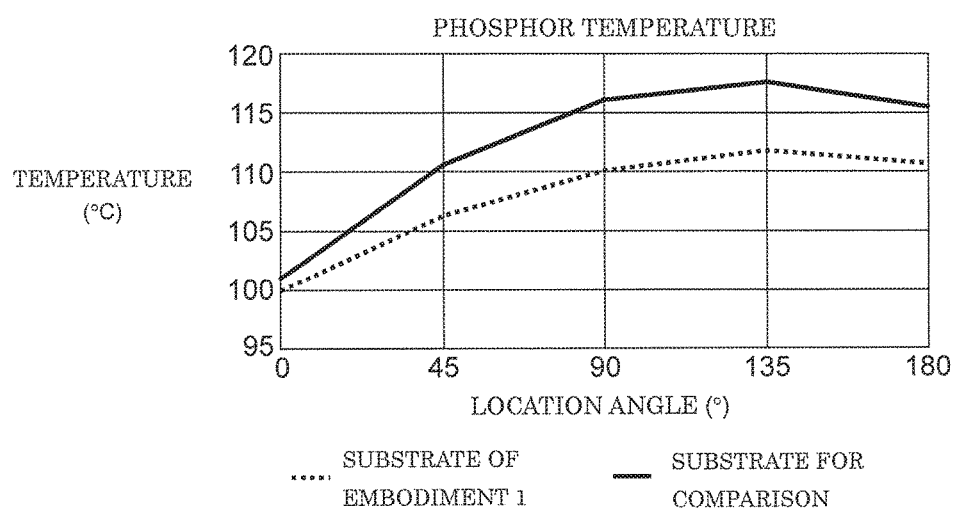

PHOSPHOR WHEEL DEVICE AND PROJECTOR-TYPE IMAGE DISPLAY APPARATUS

RELATED APPLICATIONS

This application is the claims the benefit of Japanese Application No. 2016-053358, filed Mar. 17, 2016, and Japanese Application No. 2017-010903, filed Jan. 25, 2017, the disclosures of which are incorporated by reference herein.

BACKGROUND

1. Technical Field

The present disclosure relates to a phosphor wheel device and a projector-type image display apparatus which includes the phosphor wheel device.

2. Description of the Related Art

There is a conventional technique of providing a notch in a portion of a substrate of a phosphor wheel device in order to achieve a rotational balance of the substrate. Japanese Unexamined Patent Application Publication No. 2013-41170 discloses a technique of reducing the intensity of excitation light irradiating a phosphor on the substrate, in order to reduce deterioration of the heat dissipating properties of the substrate caused by providing the notch.

SUMMARY

The present disclosure provides a phosphor wheel device including a substrate which achieves a rotational balance while maintaining the heat dissipating properties.

A phosphor wheel device according to the present disclosure includes: a phosphor; and a substrate which has a disc shape and on which the phosphor is provided. The phosphor is provided in at least a portion of a circumference of a circle on the substrate, the circle being centered on a center of a rotational shaft of the substrate. The substrate includes a first opening and a plurality of second openings, and the plurality of second openings extend radially with respect to the center of the rotational shaft.

The present disclosure provides a phosphor wheel device including a substrate which achieves a rotational balance while maintaining the heat dissipating properties.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates phosphor temperature measuring points on a substrate for comparison;

FIG. 6 illustrates phosphor temperature measuring points on a substrate according to Embodiment 1;

FIG. 7 illustrates the result of simulation of phosphor temperature variations resulting from the shapes of balance openings;

FIG. 8 illustrates the result of simulation of phosphor temperature variations resulting from gas when substrates are rotated;

FIG. 9A illustrates the result of adding the results illustrated in FIG. 7 and FIG. 8;

FIG. 9B illustrates simulation conditions;

DETAILED DESCRIPTION

Hereinafter, a non-limiting embodiment according to the present disclosure will be described with reference to the drawings. However, unnecessarily detailed descriptions may be omitted. For example, detailed descriptions of well-known aspects or repetitive descriptions of essentially the same configurations may be omitted. This is to avoid unnecessary redundancy and make the following description easier for those skilled in the art to understand.

It should be noted that the accompanying drawings and the following description are provided, not to limit the subject matter recited in the claims, but to aid a person skilled in the art to adequately understand the present disclosure.

Embodiment 1

Hereinafter, nonlimiting Embodiment 1 will be described with reference to FIG. 1 to FIG. 10B.

[Optical Configuration of Projector-Type Image Display Apparatus]

Figure 1:
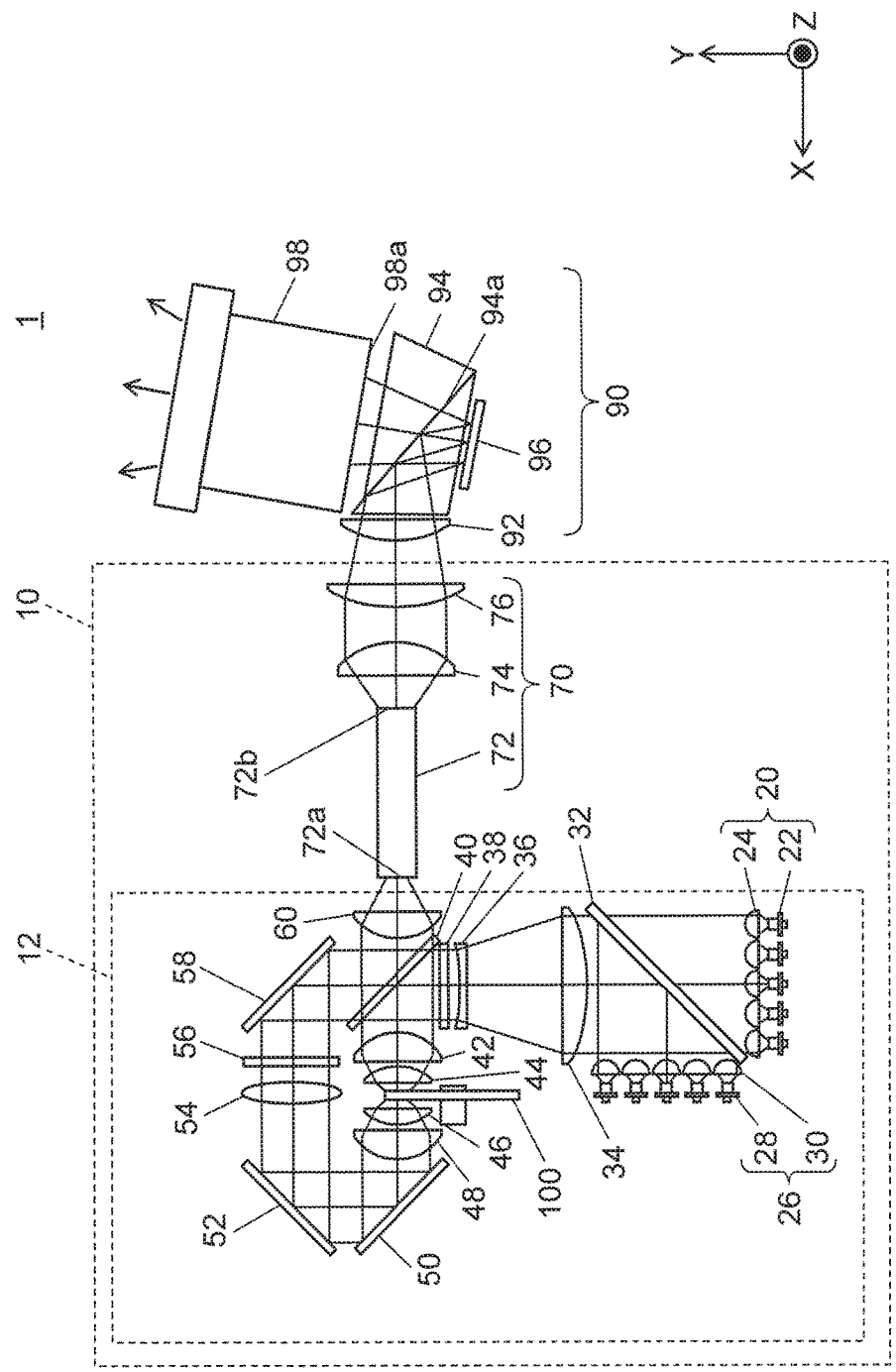
FIG. 1 illustrates the optical configuration of a projector-type image display apparatus according to Embodiment 1.

FIG. 1 illustrates the optical configuration of projector-type image display apparatus 1 according to Embodiment 1. In this example, projector-type image display apparatus 1 is a projector.

Projector-type image display apparatus 1 includes illumination device 10, image generator 90, and projection lens 98 which projects image light generated by image generator 90 onto a screen (not illustrated).

Illumination device 10 emits, to image generator 90, substantially collimated light having a uniform illuminance. Details of illumination device 10 will be described later.

Image generator 90 includes lens 92, total reflection prism 94, and one digital mirror device (DMD) 96. Lens 92 has a function of forming, on DMD 96, an image of the light emitted from illumination device 10. Specifically, light entering total reflection prism 94 via lens 92 is reflected by surface 94a and guided to DMD 96. DMD 96 has a plurality of s on the base. DMD 96 is controlled by a controller (not illustrated) so that each of the plurality of mirrors is turned on and off to modulate an image signal which is input to the controller, according to the image signal and timing of light of each color incident on each of the plurality of mirrors. Here, that the plurality of mirrors are turned on means that the plurality of mirrors reflect light incident from a light source, toward light incident port 98a of projection lens 98. On the other hand, that the plurality of mirrors are turned off means that the plurality of mirrors reflect the light incident from the light source, in a direction other than toward light incident port 98a of projection lens 98. The light (image light) modulated and emitted by DMD 96 passes through total reflection prism 94 and is guided to light incident port 98a of projection lens 98. In Embodiment 1, a DMD of, for example, 0.67 inch in diagonal size is used as DMD 96. DMD 96 is an example of a light modulation element.

Projection lens 98 projects, onto a screen (not illustrated) outside projector-type image display apparatus 1, temporally-combined image light incident on light incident port 98a. The f-number of projection lens 98 is 1.7, for example. Projection lens 98 is an example of a projection optical system.

[Configuration of Illumination Device]

As illustrated in FIG. 1, illumination device 10 includes light source device 12 and light-guiding optical system 70 which guides, to image generator 90, light emitted from light source device 12.

First laser modules 20 arranged in a 5×5 matrix each include semiconductor laser element 22 and collimating lens 24. Second laser modules 26 arranged in a 5×5 matrix each include semiconductor laser element 28 and collimating lens 30. Semiconductor laser elements 22 and 28 emit blue laser light having a wavelength of 450 nm. Each of collimating lenses 24 is provided for a different one of semiconductor laser elements 22, and each of collimating lenses 30 is provided for a different one of semiconductor laser elements 28. Collimating lenses 24 and 30 have a function of condensing, into a flux of parallel light, the blue laser light emitted from a corresponding one of semiconductor laser elements 22 and 28 with a spread angle. First laser modules 20 and second laser modules 26 are examples of a light source.

The blue laser light emitted from semiconductor laser elements 22 and the blue laser light emitted from semiconductor laser elements 28 are spatially combined by mirror 32. Here, laser modules 20 and 26 are equally spaced so that the blue laser light emitted from semiconductor laser elements 22 and the blue laser light emitted from semiconductor laser elements 28 are incident at different positions on mirror 32. Mirror 32 has anti-reflection (AR) coating which allows high transmission of blue laser light in a region on which the blue laser light from first laser modules 20 is incident. Mirror 32 further has mirror coating which, allows high reflection of blue laser light in a region on which the blue laser light from second laser module 26 is incident.

The blue laser light combined by mirror 32 is condensed and superimposed by lens 34. The blue laser light condensed and superimposed by lens 34 passes through lens 36 and diffuser plate 38 before being incident on dichroic mirror 40. Lens 36 has a function of making the blue laser light which has been condensed and superimposed by lens 34 a flux of parallel light again. Diffuser plate 38 has functions of reducing interference of the blue laser light condensed and superimposed by lens 34, and adjusting the degree of condensation of laser light.

Dichroic mirror 40 is a color combining element having a cut-off wavelength set to about 480 nm. Thus, the blue laser light substantially collimated by lens 36 is reflected by dichroic mirror 40 and condensed by condenser lenses 42 and 44, and then irradiates phosphor wheel device 100.

Figure 2A:
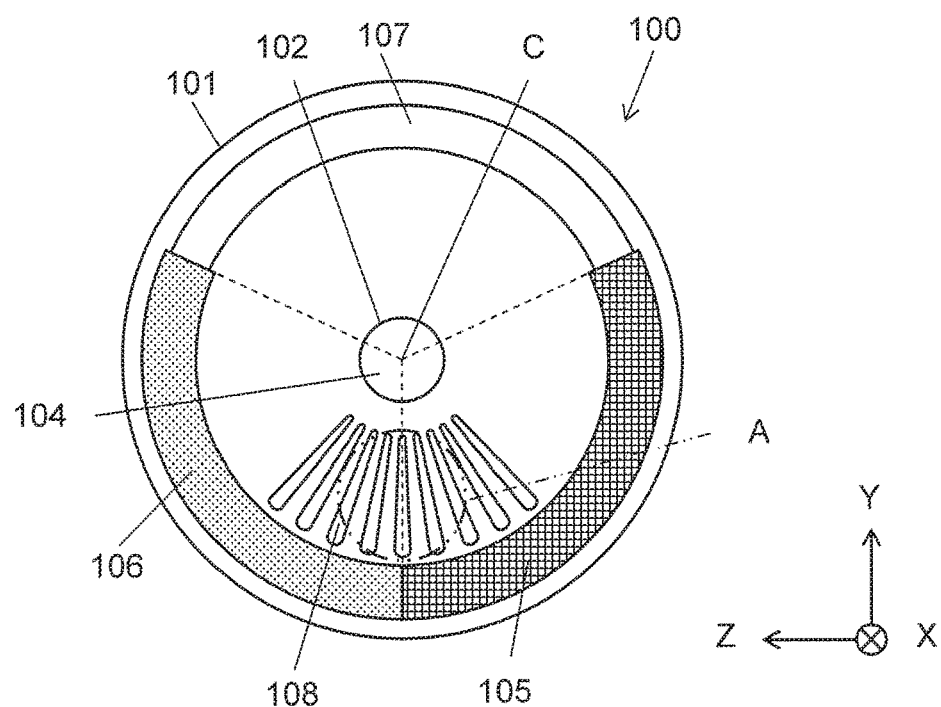
FIG. 2A is a plan view illustrating the configuration of a phosphor wheel device according to Embodiment 1.
Figure 2B:
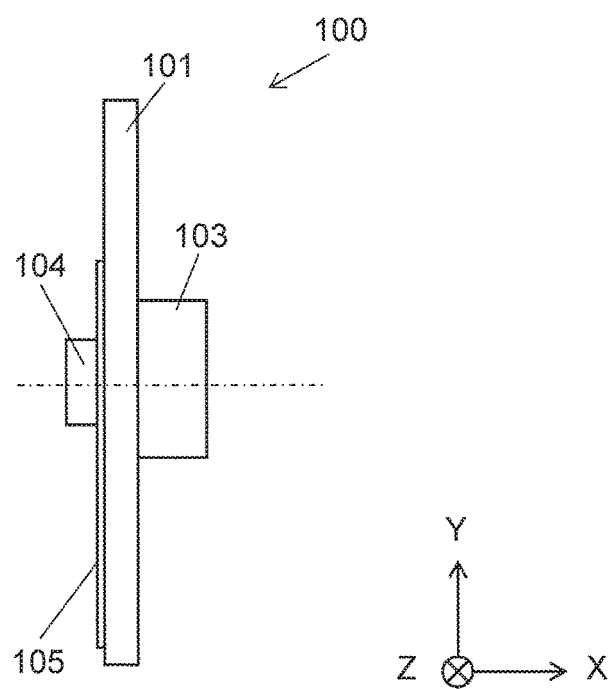
FIG. 2B is a side view illustrating the configuration of a phosphor wheel device according to Embodiment 1.

FIG. 2A is a plan view illustrating the configuration of phosphor wheel device 100 according to Embodiment 1. FIG. 2B is a side view illustrating the configuration of phosphor wheel device 100 according to Embodiment 1.

Rotation of phosphor wheel device 100 is controlled according to the period of one frame (1/60 second, for example) of an image to be projected. As illustrated in FIG. 2A, green phosphor segment 105, red phosphor segment 106, and laser light transmission opening 107 which are provided on substrate 101 along the rotational direction (circumferential direction) are irradiated with blue laser light in a temporally sequential order through rotation of substrate 101.

The blue laser light which serves as excitation light and with which a phosphor region of phosphor wheel device 100 is irradiated excites the phosphor of green phosphor segment 105 and the phosphor of red phosphor segment 106 in a phosphor spot irradiated with the blue laser light. Here, the phosphor region refers to the region in which the phosphor of green phosphor segment 105 and the phosphor of red phosphor segment 106 are provided. The excited phosphor of green phosphor segment 105 and the excited phosphor of red phosphor segment 106 emit green light and red light, respectively, toward condenser lens 44. The green light and the red light are substantially collimated by condenser lenses 44 and 42 and pass through dichroic mirror 40.

Although the blue laser light passing through laser light transmission opening 107 has been condensed by condenser lenses 42 and 44, the blue laser light is substantially collimated, again by lenses 46 and 48. The substantially collimated blue laser light returns to dichroic mirror 40 again due to mirrors 50, 52, and 58 disposed in the optical path. In addition, lens 54 for relaying light for the extended portion of the optical path and diffuser plate 56 for further reducing the interference of the blue laser light are provided in the optical path.

The blue laser light which has passed through phosphor wheel device 100 and returned to dichroic mirror 40 by being relayed along the optical path is reflected by dichroic mirror 40 toward lens 60. In such a manner as described above, the light which has passed through phosphor wheel device 100 (blue laser light) and the light emitted from phosphor wheel device 100 (green light and red light) are spatially combined by dichroic mirror 40.

The light resulting from the spatial combination by dichroic mirror 40 is condensed by lens 60 and emitted as emission light of light source device 12.

The light emitted from light source device 12 enters rod integrator 72. Rod integrator 72 includes incidence plane 72a and exit plane 72b. The light emitted from light source device 12 and incident on incidence plane 72a of rod integrator 72 travels through rod integrator 72 by which the illuminance of the light is made further uniform, and exits from exit plane 72b. The light which has exited from exit plane 72b is substantially collimated by lenses 74 and 76 and emitted from illumination device 10 to image generator 90.

[Operation of Projector-Type Image Display Apparatus]

An operation of projector-type image display apparatus 1 having the above configuration will be hereinafter described.

According to projector-type image display apparatus 1, illumination device 10 emits light of three colors, namely, red light, green light, and blue light, which are switched from one another temporally. Image generator 90 generates image light from the light emitted from illumination device 10. Projection lens 98 enlarges and projects, onto the screen, the image light which has been generated by image generator 90 and has entered projection lens 98 from incident port 98a. The controller (not illustrated) controls DMD 96 of image generator 90 and phosphor wheel device 100 of illumination device 10 in synchronization. The controller controls DMD 96 so that DMD 96 generates image light corresponding to light of each color based on the image signal input to the controller. With this, image light of each color is projected onto the screen by time division. A user visibly recognizes the image light as an image by continuously viewing the image light projected onto the screen.

[Configuration of Phosphor Wheel Device]

With reference to FIG. 2A to FIG. 4, details of the configuration of phosphor wheel device 100 will be described.

Phosphor wheel device 100 includes substrate 101 having a disc shape and made of aluminum. Attachment hole 102 is provided at center C of substrate 101. Rotational shaft 104 of motor 103 is attached into attachment hole 102, and motor 103 drives substrate 101 so that substrate 101 rotates. On one side of substrate 101 of phosphor wheel device 100, green phosphor segment 105, red phosphor segment 106, and laser light transmission opening 107 are provided along the same circumference of a circle on substrate 101 for an angle of 120° each. Substrate 101 is further provided with a plurality of balance openings 108 in a region inside the circumference along which green phosphor segment 105, red phosphor segment 106, and laser light transmission opening 107 are provided. Here, laser light transmission opening 107 is an example of a first opening, and balance openings 108 are an example of second openings.

Balance openings 108 are provided in order to achieve a rotational balance of substrate 101. Substrate 101, in the manufacturing process, achieves a rotational balance when attachment hole 102 is provided at the center. However, when laser light transmission opening 107 is provided in substrate 101, substrate 101 loses the rotational balance as the weight balance is significantly broken down. Also when phosphors are thrilled on substrate 101, the weight of the phosphors affects the rotational balance. Balance openings 108 are provided in order to eliminate such rotational unbalance of substrate 101.

In Embodiment 1, a plurality of, specifically nine, balance openings 108 are provided. Balance openings 108 are elongated holes extending in the radial direction with respect to center C of substrate 101 having a disc shape. Moreover, the shape of the elongated holes is specifically a thin and elongated drop shape (droplet shape) which increases in width as balance openings 108 extend in the radial direction with respect to center C of substrate 101 having a disc shape.

As can be seen from FIG. 2A, the plurality of balance openings 108 are provided in a region of substrate 101 inside the circumference along which laser light transmission opening 107, green phosphor segment 105, and red, phosphor segment 106 are provided. Furthermore, the plurality of balance openings 108 are provided in proximity to one another in a region across rotational shaft 104 from laser light transmission opening 107.

Figure 3:
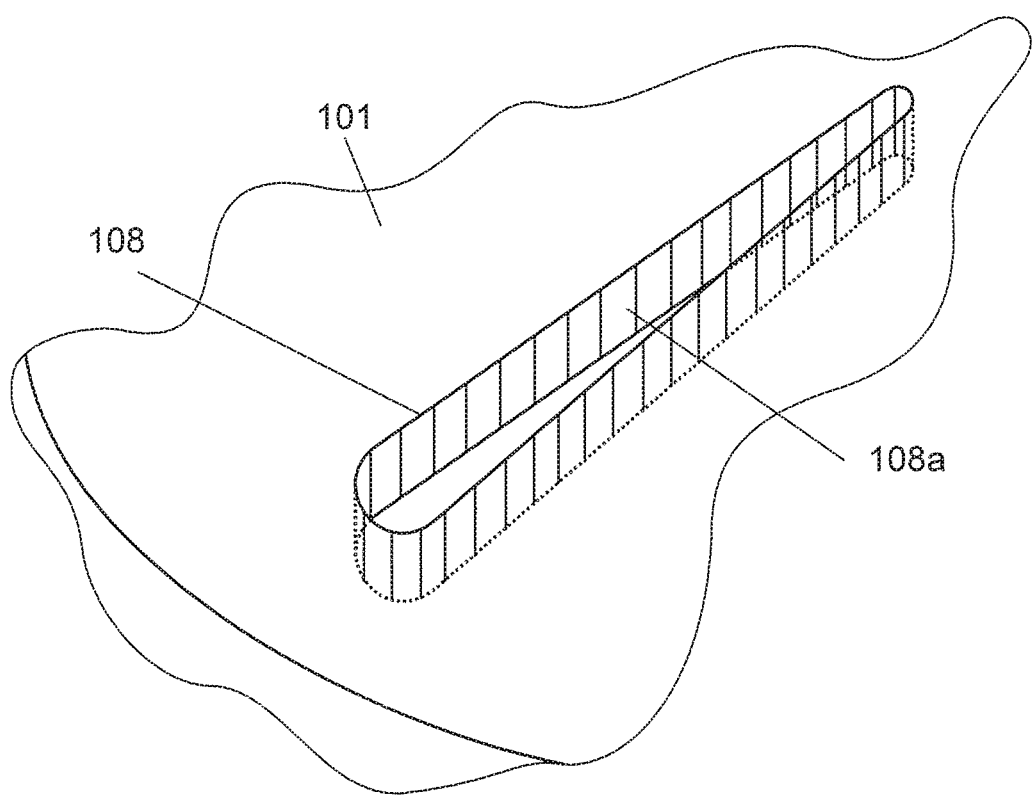
FIG. 3 is an enlarged perspective view of one of balance openings according to Embodiment 1.
Figure 4:
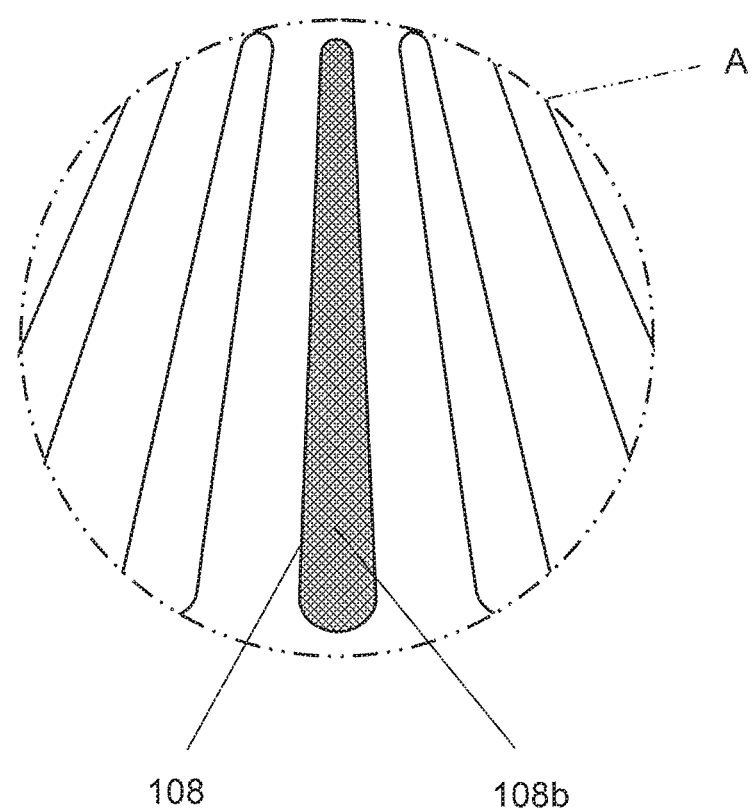
FIG. 4 is an enlarged view of portion A in FIG. 2A.

FIG. 3 is an enlarged perspective view of one of balance openings 108 according to Embodiment 1. FIG. 4 is an enlarged view of portion A in FIG. 2A.

The phosphors excited by blue laser light generate heat when emitting light, and thus a material such as aluminum having excellent heat dissipating properties is used. Here, in the case where substrate 101 is provided with a balance opening having a large opening area relative to the thickness of substrate 101, the heat dissipating area (surface area) of substrate 101 decreases, deteriorating the heat dissipating effect. In Embodiment 1, however, deterioration of the heat dissipating effect can be reduced even when balance openings 108 are provided. That is to say, the shape of balance openings 108 is optimized to reduce deterioration of the heat dissipating effect of substrate 101.

Here, assume that the area of inner surface 108a (hatched portion) of balance opening 108 illustrated in FIG. 3 is area S1, and the sum of the areas of end surfaces 108b (hatched portion) of balance opening 108 illustrated in FIG. 4 is area S2. In this case, S1 is desirably as close to S2 as possible, that is, area S1 is desirably greater than or equal to 90% of area S2 (S1≈S2), in order to reduce deterioration of the heat dissipating effect of substrate 101. It should be noted that an experiment has confirmed that a desired heat dissipating effect can be obtained when area S1 is greater than or equal to 70% of area S2.

In Embodiment 1, nine balance openings 108 having the same shape and same size are provided, and thus the size of balance openings 108 is determined such that the sum of areas S1 (S1×9) is greater than or equal to 70%, preferably greater than or equal to 90%, of the sum of areas S2 (S2×9).

Normally, the thickness of the substrate is on the order of 1 mm, and thus it is possible to easily ensure a heat dissipating area on the inner surface of each opening by forming balance openings 108 into such a shape as in Embodiment 1.

Advantageous Effects

Hereinafter, advantageous effects of Embodiment 1 will be described with reference to FIG. 5 to FIG. 10B. FIG. 5 illustrates phosphor temperature measuring points provided on substrate 111 for comparison. FIG. 6 illustrates phosphor temperature measuring points provided on substrate 101 according to Embodiment 1. As illustrated in FIG. 5, substrate 111 provided with one large balance opening 118 having a fan shape is used for comparison with Embodiment 1. Attachment hole 112 is provided at center C of substrate 111. On one side of substrate 111, green phosphor segment 115, red phosphor segment 116, and laser light transmission opening 117 are provided along the same circumference of a circle on substrate 111, for an angle of 120° each. Substrate 111 is further provided with one large balance opening 118 having a fan shape in a region inside the circumference along which green phosphor segment 115, red phosphor segment 116, and laser light transmission opening 117 are provided.

With substrate 101 according to Embodiment 1 from which advantageous effects have been confirmed, the sum of areas S1 of inner surfaces 108a of balance openings 108 is set to about 99% of the sum of areas S2 of end surfaces 108b of balance openings 108, that is, the sum of areas S1 of inner surfaces 108a of balance openings 108 and the sum of areas S2 of end surfaces 108b of balance openings 108 are made approximately equal.

(Heat Dissipating Effect)

The temperature of phosphors applied to substrate 111 illustrated in FIG. 5 and the temperature of phosphors applied to substrate 101 illustrated in FIG. 6 are simulated. As illustrated in FIG. 5 and FIG. 6, points at five angles, namely, 0°, 45°, 90°, 135°, and 180° in the phosphor region are set as temperature measuring points. At these points of the five angles, phosphor temperature measurement was simulated.

The method of simulation is described below.

First, substrate 101 of FIG. 6 and substrate 111 of FIG. 5 are heated to 55 W (wattage) as a result of irradiation of phosphors with a laser light spot while the laser light spot rotates at a rotational speed of substrates 101 and 111, with substrates 101 and 111 kept still.

FIG. 7 illustrates the result of simulation of phosphor temperature variations resulting from the shapes of balance openings 108 and 118. Phosphor temperatures are measured at the temperature measuring points, and FIG. 7 illustrates the degree of temperature variation resulting from the shapes of balance openings 108 and 118, from the phosphor temperatures at the 0° point and the 180° point serving as reference temperatures. In the graph of FIG. 7, the temperature rise reaches a peak at about 90° because the presence of openings 108 and 118 causes a decrease in the heat dissipating effect of substrates 101 and 111 in the region near the 90° point.

Next, rotating substrate 101 illustrated in FIG. 6 and substrate 111 illustrated in FIG. 5 in the direction of arrow A causes a flow of gas in a direction opposite the rotational direction of substrates 101 and 111 (the direction of a dashed arrow). At this time, when the flow of gas is observed with substrates 101 and 111 kept still, there is a flow of the air, which is gas, in a direction from the 0° point to the 180° point. In this case, heat from the phosphors provided on substrates 101 and 111 causes a rise in the air temperature. FIG. 8 illustrates the result of simulation of phosphor temperature variations resulting from gas when substrates 101 and 111 are rotated. As illustrated in FIG. 8, the phosphor temperatures gradually rise from the 0° point to the 180° point. This is because the air temperature at the 0° point located farther away from balance openings 108 and 118 is low but the air temperature increases from the 0° point to the 180° point, and the cooling effect brought about by the air decreases.

FIG. 9A illustrates the result of adding the results illustrated in FIG. 7 and FIG. 8. FIG. 9B illustrates simulation conditions. As can be seen from FIG. 9A, substrate 101 according to Embodiment 1 is lower than substrate 111 for comparison in phosphor temperature by five degrees Celsius or greater.

(Noise Reduction Effect)

An experimental result that substrate 101 according to Embodiment 1 having a plurality of balance openings 108 generates smaller noise when rotating than substrate 111 for comparison having one balance opening 118 was obtained. For cause analysis, simulation of gas distribution when substrates 101 and 111 are rotated in the air at 10800 rpm was conducted, and the pressure at opening end P was calculated.

Figure 10A:
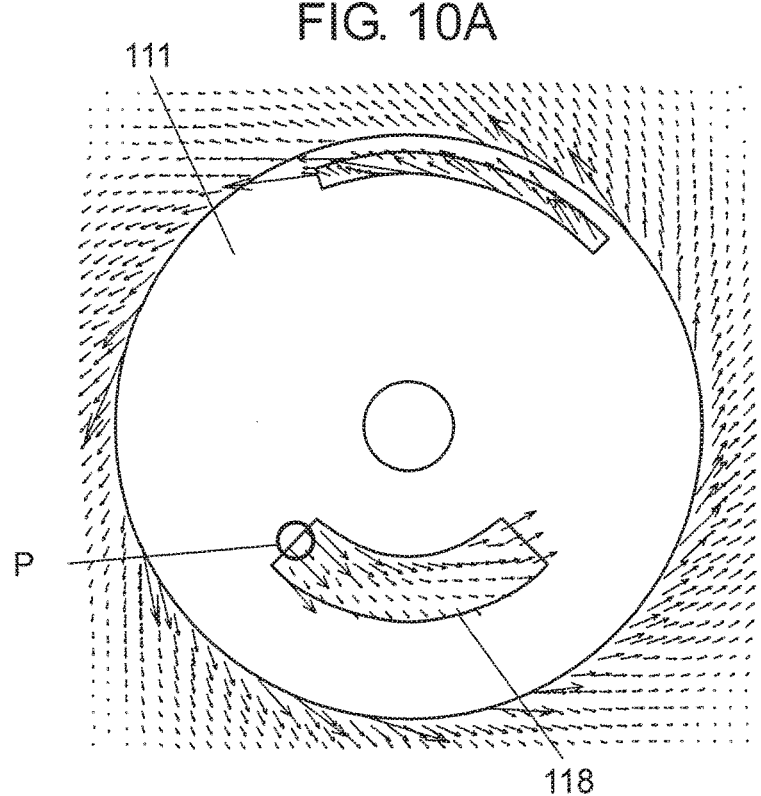
FIG. 10A illustrates the result of simulation of flow velocity distribution when a substrate for comparison is rotated.
Figure 10B:
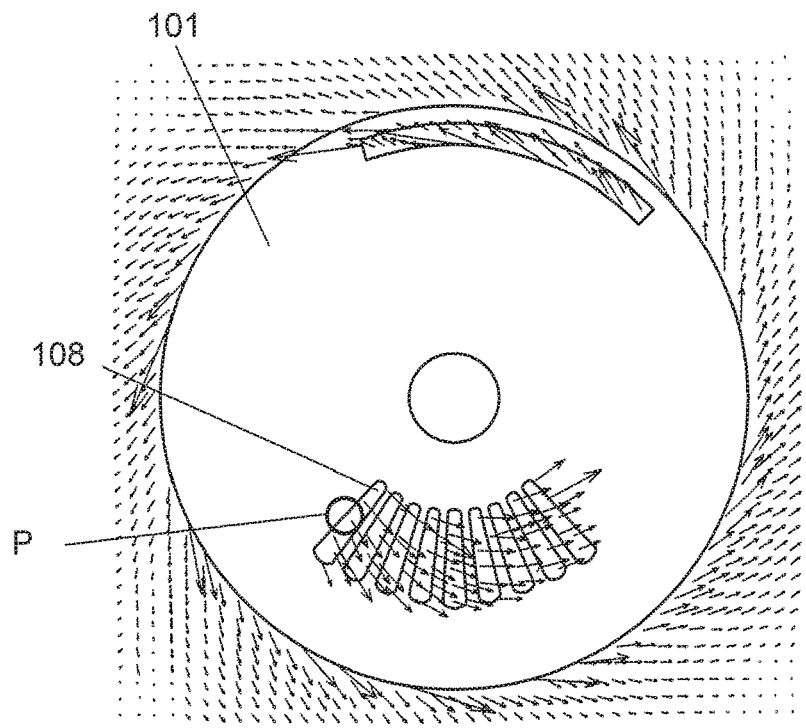
FIG. 10B illustrates the result of simulation of flow velocity distribution when a substrate according to Embodiment 1 is rotated.

FIG. 10A illustrates the result of simulation of flow velocity distribution when substrate 111 for comparison is rotated. FIG. 10B illustrates the result of simulation of flow velocity distribution when substrate 101 according to Embodiment 1 is rotated. Here, opening end P is, as illustrated in FIG. 10A and FIG. 10B, the leftmost end portion of balance openings 118 and 108. In general, the volume of noise generated when substrates 101 and 111 rotate depends on the magnitude of the pressure at opening end P. That is to say, the greater the pressure at opening end P is, the greater the noise becomes.

As a result of the simulation, the pressure at opening end P of balance openings 108 of substrate 101 according to Embodiment 1 was 58.9 Pa (pascals), whereas the pressure at opening end P of balance opening 118 of substrate 111 for comparison was 105.0 Pa. This result confirmed that substrate 101 according to Embodiment 1 having a plurality of balance openings 108 has a smaller pressure at opening end P, that is, generates smaller noise.

Furthermore, when substrates 111 and 101 are rotated in the air at 10800 rpm, the air around substrates 111 and 101 has the flow velocity distribution illustrated in FIG. 10A and FIG. 10B, respectively, according to a simulation. Here, the length of the arrows (vectors) represents the magnitude of the flow velocity. That is to say, the longer the length of an arrow is, the higher the flow velocity is, whereas the shorter the length of an arrow is, the lower the flow velocity is. In the case of substrate 111 for comparison, the flow velocity at the central portion of balance opening 118 is low, but the flow velocity at opening end P is high. In contrast, in the case of substrate 101 according to Embodiment 1, the flow velocity around balance openings 108 has a uniform distribution.

This means that with substrate 111 for comparison, the inner surface of balance opening 118 collides against the surrounding air. In contrast, with substrate 101 according to Embodiment 1, the surrounding air moves with balance openings 108, and thus the air does not collide against inner surface 108a. As a result, shaping balance openings 108 into a plurality of elongated holes enables noise reduction.

Embodiment 2

Hereinafter, non-limiting Embodiment 2 will be described with reference to FIG. 11 and FIG. 12. Repetitive descriptions of the configuration identical to Embodiment 1 is omitted, and only the different aspects will be described.

Figure 11:
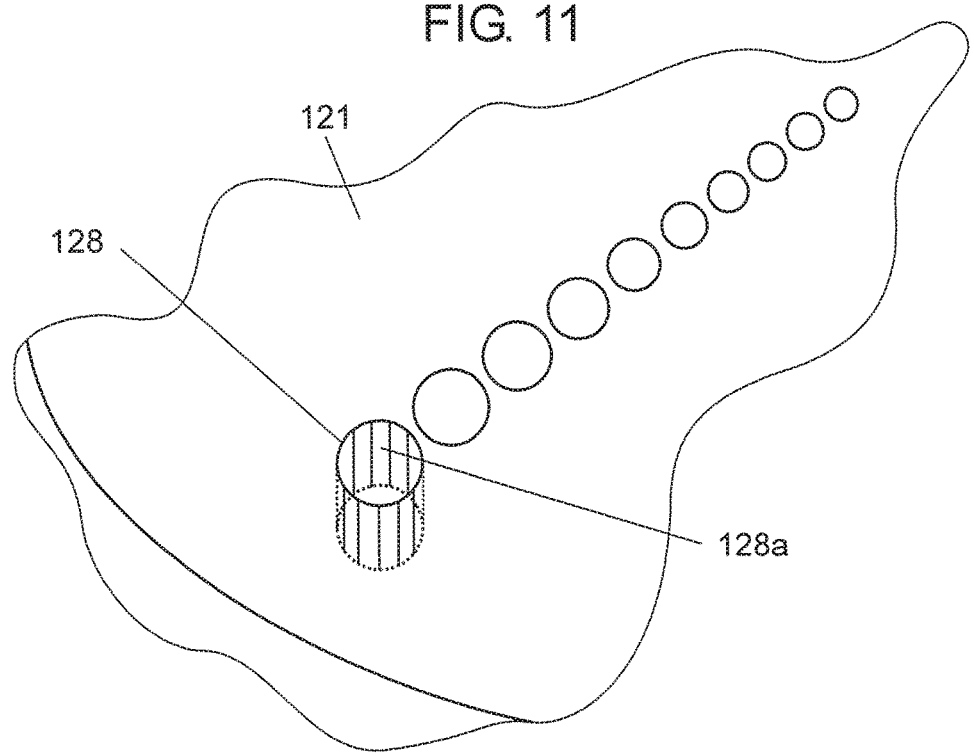
FIG. 11 is an enlarged perspective view of one of balance openings according to Embodiment 2.
Figure 12:
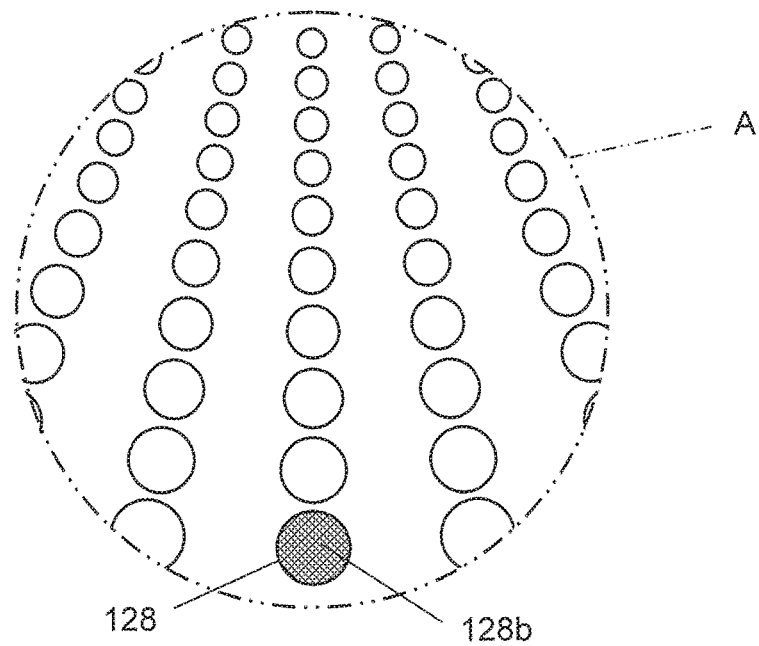
FIG. 12 is an enlarged view of a portion of a substrate according to Embodiment 2, corresponding to portion A in FIG. 2A.

FIG. 11 is an enlarged perspective view of one of balance openings 128 according to Embodiment 2. FIG. 12 is an enlarged view of a portion of substrate 121 according to Embodiment 2, corresponding to portion A in FIG. 2A. As illustrated in FIG. 11 and FIG. 12, the plurality of balance openings 128 each have a circular shape and are arranged in a plurality of lines extending in a radial direction with respect to the center of rotational shaft 104. In each of the plurality of lines, the plurality of balance openings 128 increase in diameter with decrease in distance to the outer rim of substrate 121.

Here, a non-limiting specific example of the arrangement is that the centers of the openings in the same line align in a straight line.

In order to reduce deterioration of the heat dissipating effect of substrate 121, a sum of the areas of inner surfaces 128a of the plurality of balance openings 128 is desirably greater than or equal to 90% of a sum of the areas of end surfaces 128b of the plurality of balance openings 128. In addition, a desired heat dissipating effect can be achieved when the sum of the areas of inner surfaces 128a of the plurality of balance openings 128 is greater than or equal to 70% of the sum of the areas of end surfaces 128b of the plurality of balance openings 128.

Other Embodiments

As described above, non-limiting embodiments have been presented as examples of the techniques disclosed in the present application. However, the techniques according to the present disclosure are not limited to the above embodiments, and are also applicable to embodiments obtained through changes, substitution, addition, omission, etc., to the above embodiments. Furthermore, it is also possible to make a new embodiment by combining the structural elements described in the above embodiments.

In view of this, other exemplary embodiments will be described hereinafter.

The above embodiments have described, as an example of the light source, laser modules 20 and 26 including semiconductor laser elements 22 and 28, respectively, which are arranged in a 5×5 matrix. The number and arrangement of the semiconductor laser elements are, however, not limited to this, and may be set as appropriate according to, for example, the light intensity per semiconductor laser element or desired output of the light source device. Furthermore, the wavelength of laser light is not limited to 450 nm, and it is possible to use, for example, a purple semiconductor laser element which outputs light having a wavelength of 405 nm, or a semiconductor laser element which outputs ultraviolet light having a wavelength less than or equal to 400 nm.

The above embodiments have described the configuration in which blue laser light excites phosphors having a serium-activated garnet structure so that light having the wavelength of red light as the main wavelength and light having the wavelength of green light as the main wavelength are emitted. However, it is also possible to use a phosphor which emits light having the wavelength of yellow light as the main wavelength and a phosphor which emits light having the wavelength of cyan light as the main wavelength.

Moreover, red light may be extracted by providing a yellow phosphor segment in place of the red phosphor segment according to the above embodiments and providing a color filter at a stage following the phosphor wheel device.

Although the first opening according to the above embodiments has a peripheral edge, the first opening may have a notched shape.

Although only some exemplary embodiments of the present disclosure have been described in detail above, those skilled, in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. A phosphor wheel device, comprising:
   a phosphor; and
   a substrate which has a disc shape and on which the phosphor is provided,
   wherein the phosphor is provided in at least a portion of a circumference of a circle on the substrate, the circle being centered on a center of a rotational shaft of the substrate,
   the substrate includes a first opening and a plurality of second openings, and
   the plurality of second openings extend radially with respect to the center of the rotational shaft, and
   wherein each of the plurality of second openings is an elongated hole extending in a radial direction with respect to the center of the rotational shaft, and
   each of the plurality of second openings has a thin and elongated drop shape which increases in width as the second opening extends in the radial direction.

2. The phosphor wheel device according to claim 1, wherein the plurality of second openings are provided in a region of the substrate inside the circumference along which the first opening and the phosphor are provided, and the plurality of second openings are provided in proximity to one another in a region across the rotational shaft from the first opening.

3. The phosphor wheel device according to claim 1, wherein a sum of areas of inner surfaces of the plurality of second openings is greater than or equal to 70% of a sum of areas of end surfaces of the plurality of second openings.

4. A projector-type image display apparatus, comprising:
   the phosphor wheel device according to claim 1;
   a light source which irradiates the phosphor and the first opening;
   a light modulation element which emits image light by modulating light from the phosphor wheel device according to an image signal; and
   a projection optical system which enlarges and projects the image light emitted from the light modulation element.

5. A phosphor wheel device, comprising:
   a phosphor; and
   a substrate which has a disc shape and on which the phosphor is provided,
   wherein the phosphor is provided in at least a portion of a circumference of a circle on the substrate, the circle being centered on a center of a rotational shaft of the substrate,
   the substrate includes a first opening and a plurality of second openings, and
   the plurality of second openings extend radially with respect to the center of the rotational shaft, and
   wherein the plurality of second openings each have a circular shape and are arranged in a plurality of lines extending in a radial direction with respect to the center of the rotational shaft.

6. The phosphor wheel device according to claim 5, wherein in each of the plurality of lines, the plurality of second openings increase in diameter with decrease in distance to an outer rim of the substrate.

7. The phosphor wheel device according to claim 5, wherein the plurality of second openings are provided in a region of the substrate inside the circumference along which the first opening and the phosphor are provided, and the plurality of second openings are provided in proximity to one another in a region across the rotational shaft from the first opening.

8. The phosphor wheel device according to claim 5, wherein a sum of areas of inner surfaces of the plurality of second openings is greater than or equal to 70% of a sum of areas of end surfaces of the plurality of second openings.

9. A projector-type image display apparatus, comprising:
   the phosphor wheel device according to claim 5;
   a light source which irradiates the phosphor and the first opening;
   a light modulation element which emits image light by modulating light from the phosphor wheel device according to an image signal; and
   a projection optical system which enlarges and projects the image light emitted from the light modulation element.

* * * * *